US005128075A

United States Patent [19]

Robyn et al.

[11] Patent Number: 5,128,075

[45] Date of Patent: Jul. 7, 1992

[54] CERAMIC WELDING REPAIR PROCESS

[75] Inventors: Pierre Robyn, Nivelles; Pierre Deschepper, Charleroi, both of Belgium

[73] Assignee: Glaverbel, Brussels, Belgium

[21] Appl. No.: 537,813

[22] Filed: Jun. 14, 1990

[30] Foreign Application Priority Data

Jun. 20, 1989 [GB] United Kingdom ................. 8914166

[51] Int. Cl.[5] ........................ B05D 1/08; B32B 35/00; C21B 7/06; F27D 1/16

[52] U.S. Cl. ........................................ 264/30; 264/35; 264/36; 264/81; 264/309; 264/334; 264/337; 266/281; 427/140; 427/423

[58] Field of Search ....................... 264/30, 36, 80, 81, 264/35, 309, 31-34, 39, 85, 82, 83, 327, 332, 334, 337; 427/423, 140; 501/88; 266/281

[56] References Cited

U.S. PATENT DOCUMENTS

| | | | |
|---|---|---|---|
| 2,877,009 | 3/1959 | Doll | 266/281 |
| 3,396,961 | 8/1968 | Farrington | 264/30 X |
| 3,458,607 | 7/1969 | Sullivan et al. | 264/30 |
| 3,531,098 | 9/1970 | Resch et al. | 264/30 X |
| 3,563,523 | 2/1971 | Wendt, Jr. | 264/30 X |
| 3,833,334 | 9/1974 | Riley | 264/30 X |
| 4,023,781 | 5/1977 | Fritz et al. | 264/30 |
| 4,257,990 | 3/1981 | Thomas et al. | 264/36 |
| 4,283,042 | 8/1981 | Kubo | 264/30 X |
| 4,385,749 | 5/1983 | van der Linden | 264/30 X |
| 4,442,052 | 4/1984 | Regnertson | 264/30 |
| 4,487,397 | 12/1984 | Antonov et al. | 264/30 |
| 4,792,468 | 12/1988 | Robyn et al. | 264/30 X |
| 4,890,375 | 1/1990 | Browning | 29/402.18 X |
| 4,900,484 | 2/1990 | Zlamal | 264/30 |

FOREIGN PATENT DOCUMENTS

| | | |
|---|---|---|
| 2066355 | 6/1971 | France . |
| 921576 | 3/1963 | United Kingdom . |
| 1330894 | 9/1973 | United Kingdom . |
| 2144055 | 2/1985 | United Kingdom . |
| 2203526 | 10/1988 | United Kingdom . |

OTHER PUBLICATIONS

Tanizawa, Y., JP68,410/89, *Patent Abstracts of Japan*, vol. 13, No. 273 (C-609) [3621] Jun. 22, 1989, 1-68410(A).

*Primary Examiner*—Karen Aftergut
*Attorney, Agent, or Firm*—Spencer, Frank & Schneider

[57] ABSTRACT

A method of repairing an eroded refractory wall pierced by one or more openings using a ceramic welding technique. A member of shape substantially complementary to the desired shape of the repaired opening is placed into each opening so that the member projects from the refractory wall by an extent at least equal to the local depth of erosion. Such complementarily-shaped member is so composed that it is adapted to withstand ceramic welding temperatures. A desired refractory repair mass is built up, by ceramic welding, adherent to the eroded wall and surrounding the complementarily-shaped members(s) while leaving its end or their ends exposed, and the complementarily-shaped member(s) is or are thereafter removed from the repaired openings(s). Such complementarily-shaped member may, for example, be of refractory carbon or of steel, such as stainless steel. Such a steel member may be tubular for the circulation of coolant.

4 Claims, 1 Drawing Sheet

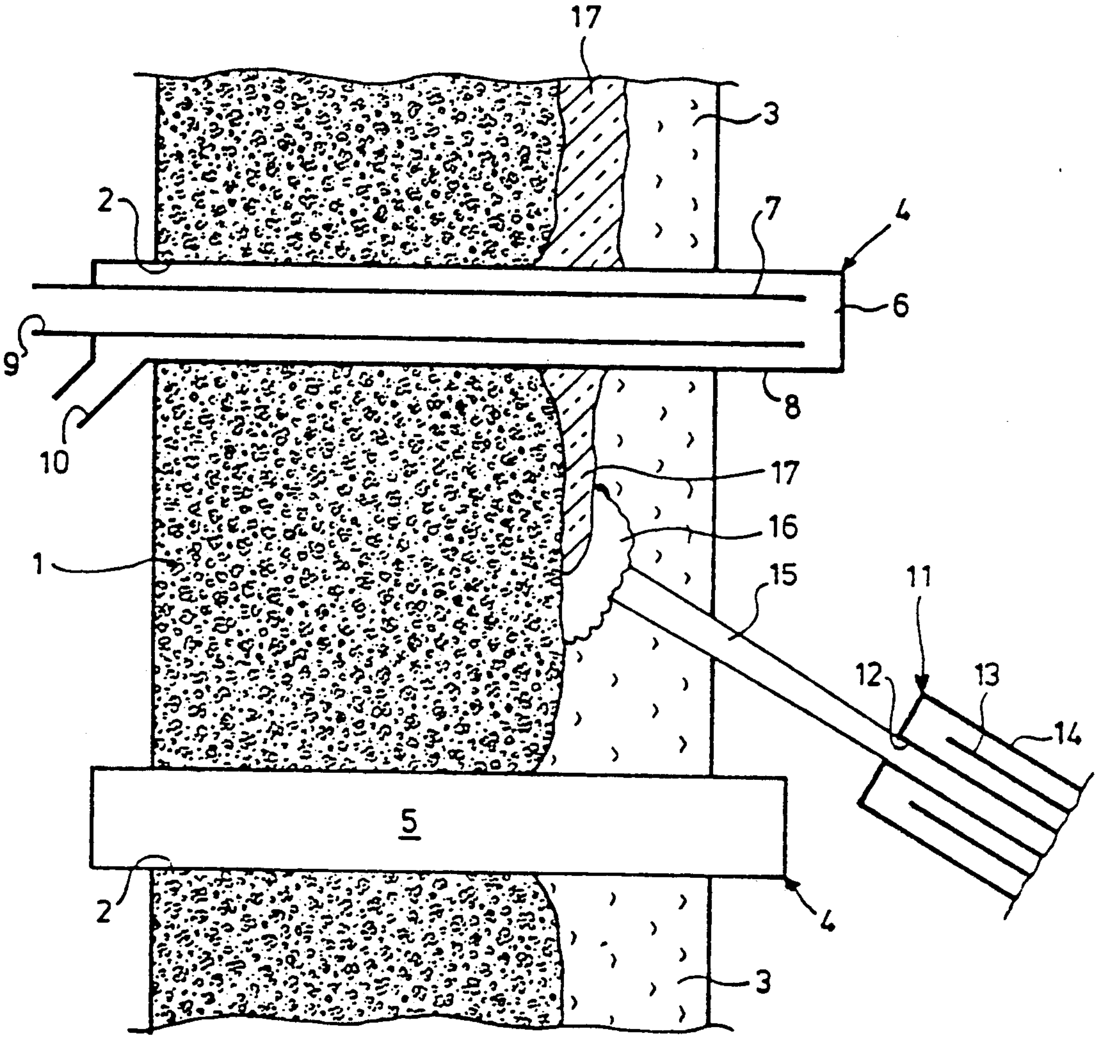
17
3
2
7
4
6
9
8
10
17
16
1
15
11
12
13
14
5
2
4
3

CERAMIC WELDING REPAIR PROCESS

BACKGROUND OF THE INVENTION

1. Field of the Invention

This invention relates to a ceramic welding repair process. Ceramic welding repair processes are useful inter alia for the repair of hot refractory structures such as furnaces or ovens of various kinds, and they enable eroded areas of the refractory structure (provided that those areas are accessible) to be repaired while the structure is substantially at its operating temperature and in some cases even when the structure is still operating.

2. Description of the Related Art

In ceramic welding processes, refractory powder, fuel powder and oxidising gas are projected against the site to be repaired and the fuel is burnt so that the refractory powder becomes at least partially melted or softened and a refractory repair mass is progressively built up at the repair site. The fuel used is of a nature that it can form a refractory oxide on combustion, and typically consists of silicon and/or aluminium, though other materials such as magnesium may also be used. The refractory powder is typically selected so that the chemical composition of the repair mass matches as closely as possible the composition of the refractory to be repaired, though it may be varied, for example so as to deposit a coating of a higher grade refractory on the base structure. In usual practice, the fuel and refractory powders are projected from a lance as a mixture in a stream of oxidising carrier gas.

Due to the intense heat liberated on combustion of fuel powders which form refractory oxides at or close to the surface to be repaired, that surface also becomes softened or melted, and as a result, the repair mass, which is itself largely fused together becomes strongly adherent to the repaired wall, and a highly effective and durable repair results. An early disclosure of ceramic welding repair techniques is to be found in British Patent No. 1,330,894.

Such known techniques give very good results when applied to large plain wall areas such as are encountered in coke ovens and in the vaults of glass furnaces, and they are also very useful for the repair of rather large openings in walls, such as dog house arches and burner ports of glass melting furnaces. By suitable choice of lance outlet, such techniques may be adapted for the repair of smaller openings, such as the tap holes of, for example, basic oxygen (L-D) steelmaking furnaces which typically have a diameter of about 20 cm, see for example British Patent Specification No. GB 2 144 055 A.

There is however a problem involved in the repair of refractory wall areas which contain smaller openings, for example below 10 cm, where it is not really practicable to insert a lance into the opening with sufficient clearance to manipulate it to effect the required repair. Typical examples of such small openings are tuyère openings for the introduction of air or other gases, or indeed powdered material such as carbon powder, into tanks for various purposes, such as in copper, zinc and other metal converters, basic oxygen steelmaking furnaces, blast furnaces, gas burner blocks (e.g. side ports) in glass furnaces and submerged openings provided for the introduction of electrodes into a melt, for example in a glass furnace or for bubbling a gas through a melt. It is an unfortunate fact of life that because of the excitement of the melt by the introduction of gas or other material, or by the concentration of electric current at the location of the openings, the areas of the refractory wall immediately surrounding such openings are often among the most readily eroded in the furnace.

SUMMARY OF THE INVENTION

It is an object of the present invention to provide a ceramic welding technique which enables such wall areas to be repaired effectively.

According to this invention, there is provided a method of repairing an eroded refractory wall pierced by one or more openings using a ceramic welding technique, wherein into the or each opening is placed a member of shape substantially complementary to the desired shape of the repaired opening so that such member projects from the refractory wall by an extent at least equal to the local depth of erosion, such complementarily-shaped member being so composed that it is adapted to withstand ceramic welding temperatures, a desired refractory repair mass is built up, by ceramic welding, adherent to the eroded wall and surrounding said complementarily-shaped member(s) while leaving its end or their ends exposed, and the complementarily-shaped member(s) is or are thereafter removed from the repaired opening(s).

Such a method enables an eroded refractory wall pierced by such openings to be repaired effectively and rapidly. In particular, such technique enables the refractory repair mass to be built up in such a way that the openings are not plugged by the repair mass. This is particularly important, because we have found that in order to clear a plugged opening which is relatively long and narrow, in view of the mechanical resistance of the repair mass itself, it would be necessary to use a percussion drilling technique, and this would necessarily lead to a risk of cracking the repair around the opening which would militate against a good repair life. Withdrawal of the complementarily-shaped member leaves an opening whose size is well defined by that member. This is particularly advantageous in the case of buyère openings, where the size and shape of the opening is of importance for determining the flow of gas, and in the case of openings for, for example, electrodes or tuyères, where a well defined size and shape of opening facilitates sealing of the opening around the electrode or tuyère.

The choice of composition of the complementarily-shaped members is of considerable importance. It is not sufficient simply to use any tubing that may come to hand. In view of the very high temperatures attained in the reaction at the repair site, the projecting ends of any complementarily-shaped members which are not sufficiently resistant may simply be mown down like blades of grass as the reaction occurs, again requiring the openings to be drilled out. In some preferred embodiments of the invention a said complementarily-shaped member is a member of steel or of refractory carbon. Steel members, in particular stainless steel members, can have sufficient refractoriness and conductivity that their projecting parts do not become destroyed during the ceramic welding operation. Refractory carbon members are also able to withstand the temperatures involved in the ceramic welding reaction. Such a carbon member may be of refractory graphite, or it may be of gas carbon. In the case of the repair of a well pierced with holes for accommodating carbon electrodes, it may be appropriate to use a used carbon electrode as such a complementarily-shaped member.

In other preferred embodiments of the invention, a said complementarily-shaped member is a tubular steel structure. When using such a tubular steel structure, it is especially preferred to circulate coolant fluid through it. It is surprising that cooling the tubular structure does not have an adverse effect on the structure of the repair mass and its bond to the base refractory structure around the opening.

BRIEF DESCRIPTION OF THE DRAWINGS

A preferred embodiment will now be described by way of example with reference to the accompanying diagrammatic drawing which is a cross section through a refractory wall undergoing repair by a ceramic welding technique in accordance with this invention.

DESCRIPTION OF THE PREFERRED EMBODIMENTS

In the drawing is shown a cross section of a wall 1 of a copper converter, the section being taken along a line tuyère openings 2. During use, the tuyère line has been eroded to form a channel 3 in the interior face of the wall 1. In accordance with the invention, for repair for a ceramic welding technique, each tuyère opening 2 has inserted into it a generally complementarily-shaped member 4. Such members 4 may be cylindrical, conical or part-conical, and they may be circular or elliptical in cross-section, or of any other appropriate shape to fit into and substantially fill the openings 2. The lower of such members in the drawing is shown as a solid member 5 which may be of steel, for example stainless steel, or of refractory carbon, for example refractory graphite. The upper of such members is shown as a tubular steel, preferably stainless steel, structure 6 comprising inner 7 and outer 8 concentric tubes, the structure 6 having an inlet 9 and an outlet 10 for the circulation of coolant fluid such as water. In a specific practical example for the repair of a copper converter, the outer tube 8 is 42 mm in diameter.

A lance 11 comprises three concentric tubes 12, 13, 14 which together constitute a water jacket surrounding the inner lance tube 12 from which is projected in an oxygen rich carrier gas a stream 15 of ceramic welding powder. The powder is a mixture of fuel particles and refractory particles and the fuel in the mixture ignites as it contacts the hot inner wall 1 at the repair site, so that the fuel is burnt in a reaction zone 16 to deposit a repair mass 17 on the repair site. The repair mass 17 is built up progressively as the lance is moved across the repair site, and will eventually fill the channel 3, thus restoring the wall 1 to good condition.

If the inner surface of the wall 1 is insufficiently hot to cause automatic ignition of the fuel in the powder stream 15, then some auxiliary ignition means may be used. As is well known in the ceramic welding art, the velocity of the powder stream 15 is maintained at a value higher than the speed of propagation of the reaction so that the reaction zone 16 is confined against the repair site.

The complementarily-shaped members 4, which are capable of withstanding the temperatures achieved in the reaction zone 16, project beyond the channel 3 so that their ends will still be exposed when the repair work is completed. After completion of that repair work, those complementarily-shaped members 4 are withdrawn from the tuyère openings 2 to leave well defined openings into which tuyères may be optionally introduced for the injection of air into the converter.

Various specific examples of ceramic welding powders suitable for the repair of refractories now follow.

EXAMPLE 1

It is desired to repair a refractory wall containing zirconiferous bricks pierced with an opening for the introduction of a gas burner to a glass melting furnace. Such zirconiferous bricks typically comprise about 30% $ZrO_2$ and 50% $Al_2O_3$ by weight. Each such opening is, when new, partly cylindrical (diameter about 60 mm) and partly frusto-conical in shape. A complementarily-shaped member in the form of a water-cooled structure such as that shown at 6 in the drawing is inserted into the opening whose surround is to be repaired, and a suitable ceramic welding powder is selected. The powder comprises by weight 35% $ZrO_2$ and 53% $Al_2O_3$ as refractory together with 8% silicon and 4% aluminium as fuel. The silicon powder has a nominal maximum grain size of 10 micrometers and a specific surface (measured by the air permeability method using Rigden's apparatus) of about 4000 $cm^2/g$. The aluminium powder has an average grain size of less than 10 micrometers and a specific surface (measured in the same way) of about 6000 $cm^2/g$. The refractory particles have an grain size between 50 micrometers and 500 micrometers. The mixture is projected at a rate of 0.5 kg/min in a stream of oxygen as carrier gas delivered at a rate of 160 L/min against the repair site which was at a temperature in excess of 1000° C. to form an adherent cohesive repair mass.

In a variant, a plain cylindrical member was used to avoid blocking of the opening by the repair process.

Two specific examples now follow of ceramic welding powders suitable for the repair of magnesia-chrome refractories for tuy/ fittings for a copper converter (for example containing by weight 50% MgO and 23.5% $Cr_2O_3$) while those refractories are at a temperature of about 1000° C.

EXAMPLE 2

The powder comprises by weight 88% crushed used magnesia-chrome brick as refractory together with 12% aluminium as fuel. The aluminium fuel powder has a nominal maximum grain size of 45 micrometers and a specific surface (again measured by the air permeability method) in excess of 3000 $cm^2/g$.

EXAMPLE 3

The powder comprises by weight 12% aluminium as fuel together with 40% chromic oxide and 48% magnesia as refractory. The aluminium fuel powder has a nominal maximum grain size of 45 micrometers and a specific surface (again measured by the air permeability method) in excess of 3000 $cm^2/g$. The refractory particles all pass a mesh of 2 mm.

Such powder mixtures are suitable fed at a rate of 70 to 120 kilograms per hour in a stream of oxygen fed at a rate of 50 to 100 normal cubic meters per hour.

What is claimed is:

1. A method of repairing a refractory wall which is eroded to various depths of erosion and which includes at least one opening at the various depths of erosion, to provide at least one repaired opening having a desired shape, the method using a ceramic welding technique, and comprising:

a. placing into each of the at least one opening a member having a shape substantially complementary to the desired shape of the repaired opening and having an outer end, so that the member projects from the refractory wall by a distance at least equal to a local depth of erosion, the member being a tubular structure provided with means for circulating cooling fluid therethrough and being made of a substance which is capable of withstanding ceramic welding temperatures;

b. cooling the tubular structure by circulating the cooling fluid therethrough;

c. building up a refractory repair mass by ceramic welding onto the eroded refractory wall so as to surround the member placed in each of the at least one opening while leaving the outer end of the member exposed; and d. removing each member from each of the at least one repaired opening.

2. The method according to claim 1, wherein the tubular structure is closed at the outer end thereof which is proximate the eroded refractory wall, and is comprised of inner and outer concentric tubes, the inner concentric tube being provided with an inlet for cooling fluid at an end thereof external to the refractory wall and the outer concentric tube being provided with an outlet for cooling fluid at an end thereof external to the refractory wall, the inner and outer concentric tubes cooperating to permit circulation of the cooling fluid through the tubular structure.

3. The method according to claim 1, wherein the member is made of steel.

4. The method according to claim 3, wherein the member is made of stainless steel.

* * * * *